United States Patent
Harvill et al.

(10) Patent No.: US 11,157,977 B1
(45) Date of Patent: Oct. 26, 2021

(54) SALES SYSTEM USING APPAREL MODELING SYSTEM AND METHOD

(75) Inventors: Young Harvill, Half Moon Bay, CA (US); Minh Thai, San Francisco, CA (US); Robert Irven Beaver, III, San Francisco, CA (US)

(73) Assignee: ZAZZLE INC., Redwood City, CA (US)

( * ) Notice: Subject to any disclaimer, the term of this patent is extended or adjusted under 35 U.S.C. 154(b) by 0 days.

(21) Appl. No.: 11/925,714

(22) Filed: Oct. 26, 2007

(51) Int. Cl.
*G06Q 30/00* (2012.01)
*G06Q 30/06* (2012.01)

(52) U.S. Cl.
CPC ................ *G06Q 30/0621* (2013.01)

(58) Field of Classification Search
CPC ............ G06F 2217/32; G06Q 30/0601; G06Q 30/0643
USPC .................... 705/26, 27, 26.1, 27.1
See application file for complete search history.

(56) References Cited

U.S. PATENT DOCUMENTS

| | | |
|---|---|---|
| 4,636,027 A | 1/1987 | Dube |
| 4,888,260 A | 12/1989 | Cowan |
| 5,134,669 A | 7/1992 | Keogh et al. |
| 5,343,401 A | 8/1994 | Goldberg et al. |
| 5,422,819 A | 6/1995 | Nakamura |
| 5,615,318 A | 3/1997 | Matsuura |
| 5,850,222 A | 12/1998 | Cone |
| 5,872,555 A | 2/1999 | Kolar et al. |
| 6,012,402 A | 1/2000 | Sekine |
| 6,012,890 A | 1/2000 | Celorio Garrido |
| 6,029,141 A | 2/2000 | Bezos et al. |
| 6,097,310 A | 8/2000 | Harrell et al. |
| 6,173,211 B1 | 1/2001 | Williams et al. |
| 6,321,670 B1 | 1/2001 | Tomita et al. |
| 6,196,146 B1 | 3/2001 | Goldberg et al. |
| 6,280,891 B2 | 8/2001 | Daniel |
| 6,310,627 B1 * | 10/2001 | Sakaguchi ............. 345/630 |
| 6,392,748 B1 | 5/2002 | Fately |
| 6,473,671 B1 * | 10/2002 | Yan .................. 700/134 |
| 6,513,921 B1 | 2/2003 | Houle |
| 6,513,924 B1 | 2/2003 | Goldberg et al. |
| 6,546,309 B1 | 4/2003 | Gazzuolo |
| 6,564,118 B1 * | 5/2003 | Swab ................ 700/131 |
| 6,804,573 B2 | 10/2004 | Goldman |
| 6,804,660 B2 | 10/2004 | Landau et al. |
| 6,842,532 B2 * | 1/2005 | Hu et al. ............. 382/111 |
| 6,859,679 B1 | 2/2005 | Smith |

(Continued)

FOREIGN PATENT DOCUMENTS

| | | |
|---|---|---|
| CN | 1536511 A | 10/2004 |
| CN | 1713196 A | 12/2005 |

(Continued)

OTHER PUBLICATIONS

PCT/US08/81215 International Search Report dated Jan. 5, 2009, 2 pages.

(Continued)

*Primary Examiner* — Brandy A Zukanovich
(74) *Attorney, Agent, or Firm* — DLA Piper LLP (US)

(57) ABSTRACT

A product modeling system and method are provided. On one embodiment, the product modeling system is used to model a piece of apparel, such as a shirt, with a design wherein the model with the design is used to display the piece of apparel with the design to a consumer.

35 Claims, 17 Drawing Sheets

(56) References Cited

U.S. PATENT DOCUMENTS

| | | | |
|---|---|---|---|
| 6,907,310 B2 * | 6/2005 | Gardner et al. | 700/132 |
| 6,947,808 B2 | 9/2005 | Goldman | |
| 6,968,075 B1 | 11/2005 | Chang | |
| 6,994,201 B2 | 2/2006 | Yu et al. | |
| 7,016,756 B2 | 3/2006 | Goldman | |
| 7,016,757 B2 | 3/2006 | Goldman | |
| 7,054,709 B2 | 5/2006 | Takeuchi | |
| 7,216,092 B1 | 5/2007 | Weber et al. | |
| 7,340,416 B1 | 3/2008 | Larabee | |
| 7,409,259 B2 * | 8/2008 | Moreno | 700/132 |
| 7,479,956 B2 * | 1/2009 | Shaw-Weeks | 345/419 |
| 7,616,851 B1 | 11/2009 | Uhlhorn et al. | |
| 8,069,091 B1 | 11/2011 | Callen et al. | |
| 8,090,461 B2 | 1/2012 | Harvill et al. | |
| 8,174,521 B2 | 5/2012 | Harvill et al. | |
| 8,175,931 B2 | 5/2012 | Harvill et al. | |
| 8,240,262 B2 | 8/2012 | Zeiger et al. | |
| 8,249,738 B2 | 8/2012 | Lastra et al. | |
| 8,401,916 B2 | 3/2013 | Harvill et al. | |
| 8,411,090 B2 | 4/2013 | Wang | |
| 8,514,220 B2 | 8/2013 | Harvill et al. | |
| 8,516,392 B2 | 8/2013 | Ostroff | |
| 8,654,120 B2 | 2/2014 | Beaver et al. | |
| 8,711,175 B2 | 4/2014 | Aarabi | |
| 8,712,566 B1 | 4/2014 | Harvill | |
| 8,878,850 B2 | 11/2014 | Harvill et al. | |
| 8,958,633 B2 | 2/2015 | Harvill | |
| 9,087,355 B2 | 7/2015 | Harvill et al. | |
| 9,213,920 B2 | 12/2015 | Harvill et al. | |
| 9,477,979 B2 | 10/2016 | Harvill et al. | |
| 2001/0026272 A1 * | 10/2001 | Feld et al. | 345/419 |
| 2002/0007228 A1 | 1/2002 | Goldman | |
| 2002/0030689 A1 | 3/2002 | Eichel et al. | |
| 2002/0082960 A1 | 6/2002 | Goedken | |
| 2002/0099524 A1 | 7/2002 | Sell et al. | |
| 2003/0023687 A1 | 1/2003 | Wolfe | |
| 2003/0076318 A1 | 4/2003 | Shaw-Weeks | |
| 2003/0120183 A1 | 6/2003 | Simmons | |
| 2003/0168148 A1 | 9/2003 | Gerber et al. | |
| 2003/0177364 A1 | 9/2003 | Walsh et al. | |
| 2003/0179197 A1 | 9/2003 | Sloan et al. | |
| 2003/0182402 A1 | 9/2003 | Goodman et al. | |
| 2003/0184544 A1 | 10/2003 | Prudent | |
| 2003/0229893 A1 | 12/2003 | Sgaraglino | |
| 2004/0024764 A1 | 2/2004 | Hsu et al. | |
| 2004/0044566 A1 | 3/2004 | Bostelmann et al. | |
| 2004/0049309 A1 | 3/2004 | Gardner et al. | |
| 2004/0078285 A1 | 4/2004 | Buvoet | |
| 2004/0078294 A1 | 4/2004 | Rollins et al. | |
| 2004/0095375 A1 | 5/2004 | Burmester et al. | |
| 2004/0153512 A1 | 8/2004 | Friend | |
| 2004/0194344 A1 | 10/2004 | Tadin | |
| 2004/0227752 A1 | 11/2004 | McCartha et al. | |
| 2004/0236455 A1 | 11/2004 | Woltman et al. | |
| 2004/0236634 A1 | 11/2004 | Ruuttu | |
| 2004/0267610 A1 | 12/2004 | Gossett et al. | |
| 2005/0065799 A1 | 3/2005 | Dare et al. | |
| 2005/0071242 A1 | 3/2005 | Allen et al. | |
| 2005/0125092 A1 | 6/2005 | Lukis et al. | |
| 2005/0131571 A1 * | 6/2005 | Costin | 700/132 |
| 2005/0144090 A1 | 6/2005 | Gadamsetty | |
| 2005/0149223 A1 | 7/2005 | Takeuchi | |
| 2005/0155316 A1 | 7/2005 | Shipley | |
| 2005/0177453 A1 | 8/2005 | Anton et al. | |
| 2005/0182707 A1 | 8/2005 | Yeager | |
| 2005/0203766 A1 | 9/2005 | Donaldson | |
| 2005/0204002 A1 | 9/2005 | Friend | |
| 2005/0238251 A1 | 10/2005 | Lunetta et al. | |
| 2005/0251462 A1 | 11/2005 | Nykamp | |
| 2006/0015207 A1 | 1/2006 | Weiser et al. | |
| 2006/0020486 A1 | 1/2006 | Kurzweil et al. | |
| 2006/0027154 A1 | 2/2006 | Naka et al. | |
| 2006/0156283 A1 | 7/2006 | Landau et al. | |
| 2006/0178952 A1 | 8/2006 | Harris | |
| 2006/0226563 A1 | 10/2006 | Albert et al. | |
| 2007/0005461 A1 | 1/2007 | Lenz | |
| 2007/0208633 A1 | 3/2007 | Singh | |
| 2007/0083383 A1 | 4/2007 | Van Bael et al. | |
| 2007/0174132 A1 | 7/2007 | Shemula | |
| 2008/0006192 A1 | 1/2008 | Zeiger et al. | |
| 2008/0079727 A1 | 4/2008 | Goldman et al. | |
| 2008/0092309 A1 | 4/2008 | Ellis et al. | |
| 2008/0147512 A1 | 6/2008 | Yankton | |
| 2008/0147219 A1 | 8/2008 | Jones | |
| 2009/0070666 A1 | 3/2009 | Eilers et al. | |
| 2009/0109214 A1 | 4/2009 | Harvill et al. | |
| 2009/0122329 A1 | 5/2009 | Hegemier et al. | |
| 2009/0182573 A1 | 7/2009 | Lidestri | |
| 2009/0190858 A1 | 7/2009 | Moody et al. | |
| 2009/0222127 A1 | 9/2009 | Lind | |
| 2009/0254207 A1 | 10/2009 | Tiffany et al. | |
| 2010/0119957 A1 | 5/2010 | Satou et al. | |
| 2010/0169185 A1 | 7/2010 | Cottingham | |
| 2010/0185309 A1 | 7/2010 | Ohiaeri et al. | |

FOREIGN PATENT DOCUMENTS

| | | |
|---|---|---|
| CN | 1828671 | 9/2006 |
| CN | 1877629 | 12/2006 |
| CN | 101663662 A | 3/2010 |
| CN | 102203818 | 9/2011 |
| EP | 1136899 | 9/2001 |
| JP | S61-255376 | 11/1986 |
| JP | H02-104758 | 4/1990 |
| JP | H07-140886 | 6/1995 |
| JP | 10-222653 A | 8/1998 |
| JP | 10-247256 A | 9/1998 |
| JP | 11-066119 A | 3/1999 |
| JP | 11076663 | 3/1999 |
| JP | 2001-052177 | 2/2001 |
| JP | 2001-314677 | 11/2001 |
| JP | 2002-133201 | 5/2002 |
| JP | 2003-122960 A | 4/2003 |
| JP | 2004-152000 A | 5/2004 |
| JP | 2005-118215 | 5/2005 |
| JP | 2007-183486 | 7/2007 |
| JP | 2011-077764 | 4/2011 |
| WO | WO 2001/087001 | 11/2001 |
| WO | WO 2002/012925 | 2/2002 |
| WO | WO 2003/085186 | 10/2003 |
| WO | WO 2008/038039 | 4/2008 |
| WO | WO 2010/022404 | 2/2010 |

OTHER PUBLICATIONS

PCT/US08/81215 Written Opinion dated Jan. 5, 2009, 6 pages.
PCT/US09/61858 International Search Report dated Dec. 18, 2009, 4 pages.
PCT/US09/61858 Written Opinion dated Dec. 18, 2009, 5 pages.
PCT/US09/52154 International Search Report dated Sep. 23, 2009, 3 pages.
PCT/US09/52154 Written Opinion dated Sep. 23, 2009, 6 pages.
PCT/US09/54806 International Search Report dated Oct. 7, 2009, 3 pages.
PCT/US09/54806 Written Opinion dated Oct. 7, 2009, 6 pages.
EP Application No. 08843251.3 Supplemental Search Report dated Nov. 23, 2010, 11 pages.
EP Application No. 09822776.2 Supplemental Search Report dated Mar. 2, 2012, 9 pages.
DeMarco "Zazzle and Pitney Bowes Team up to deliver custom stamps to consumers," (2005), published online: http//www.zazzle.com/mk/welcome/pressreleases/pr071805_2 (2 pages).
Ehara J et al: "Texture overlay onto deformable surface for virtual clothing" ACM International Conference Proceeding Series—Proceedings of The 2005 International Conference on Augmented Tele-Existence, ICAT '05 2005 Association for Computing Machinery USA, vol. 157, 2005 , pp. 172-179, XP002606672 DOI: 10.1145/1152399.1152431 (8 pages).
Ehara J et al: "Texture overlay for virtual clothing based on PCA of silhouettes" Mixed and Augmented Reality, 2006. ISMAR 2006.

(56) References Cited

OTHER PUBLICATIONS

IEEE/ACM International Symposium ON, IEEE, PI, Oct. 1, 2006 (Oct. 1, 2006), pp. 139-142, XP031014661 ISBN: 978-1-4244-0650-0 (4 pages).

Meseth "Towards Predictive Rendering in Virtual Reality" Ph.D. dissertation, Bonn University, published Oct. 2006 (369 pages).

Nelson, J "From Moon Shoes to Gel Gun—Sustaining Hart health", Columbian. Vancouver, Wash.: Oct. 11, 2007 (3 pages).

Scholz V et al: "Garment motion capture using color-coded patterns" Computer Graphics Forum Blackwell Publishers for Eurographics Assoc UK, vol. 24, No. 3, 2005, pp. 439-439, XP002603022 ISSN: 0167-7055 (9 pages).

Joele: "Research Assignment of an Augmented Reality System using ARToolKit and user invisible markers," 2005 (Jan. 1, 2005), XP055103237, Retrieved from the Internet: URL:http://graphics.tudelft.nl/~vrphobia/RA_final_report_Dennis_Joele.pdf [retrieved on Feb. 19, 2014] (66 pgs.).

Gruber, "Texture Mapping," Ted Gruber Software, Inc., pp. 1-2 (2001) (2 pgs.).

Heckbert, Paul S. "Fundamentals of texture mapping and image warping" Master's Thesis under the direction of Carlo Sequin, Dept. of Electrical Engineering and Computer Science University of California, Berkeley. Jun. 17, 1989.

Real Studio, "Real 3D Tutorials: Tutorial 5—Texture Mapping," pp. 1-5 (printed Sep. 9, 2016) (5 pgs.).

Wolfe, "Teaching Texture Mapping Visually," Nov. 1997, pp. 1-37 (37 pgs.).

Wu et al., Wavelength-multiplexed submicron holograms for disk-compatible data storage, Optics Express, vol. 15, No. 26, Dec. 24, 07, p. 17798-17804 (7 pgs.).

\* cited by examiner

SALES SYSTEM USING APPAREL MODELING SYSTEM AND METHOD

APPENDICES

Appendix A (2 pages) contains an example of the pseudo-code for finding a set of markers on a product;

Appendix B (1 page) contains an example of the code for remapping the color of an image using normalized ordinal color distribution;

Appendix C (4 pages) contains an example of the code for building a color map in normalized histogram order with an index from a matching color space;

Appendix D (2 pages) contains an example of the code for building a look-up table to remap the colors from a source sphere to a destination sphere; and Appendix E (3 pages) contains an example of the code for remapping the color of the source image with a source sphere color map to a destination image with the color map of the sphere color object.

Appendices A-E form part of the specification and are incorporated herein by reference.

FIELD

The invention relates generally to a system and method for modeling a piece of apparel.

BACKGROUND

Electronic commerce (E-commerce) is a thriving business in which various different products and services are sold to a plurality of consumers using an E-commerce site. The E-Commerce site may include a website that allows a plurality of consumers to gain access to the website using a network, such as the Internet. The website may have a plurality of web pages wherein these web pages have images of a plurality of different products that the consumer may purchase. The images contained in the plurality of web pages are two dimensional images. The website may also include a secure commerce portion that allows the consumer to select one or more items, place those items in an electronic shopping cart and, when done shopping, check out and pay for the items that remain in the electronic shopping cart using various payment services, such as PayPal or a credit card.

One limitation with these typical E-commerce systems is that the product available on the website, such as a shirt, may be modeled by a human model to show the product and its design, but is shown to the consumer as a "flat" image since it is shown to the consumer on the display of the computer being used by the consumer. Thus, the actual design of the product and how the product looks in real life is often difficult to determine from those images. This may result in consumers not purchasing the product which is undesirable.

Another limitation of these typical E-commerce systems is that the product available on the website, such as a shirt, cannot be customized by the consumer with a design on the product. Thus, the consumer cannot see the customized product with the design and this also may result in consumers not purchasing the product which is undesirable. Thus, it is desirable to provide a system and method that provides better models for products and it is to this end that the system and method are directed.

DETAILED DESCRIPTION OF ONE OR MORE EMBODIMENTS

The system and method are particularly applicable to a web based client/server model system and method for selling a shirt modeling with a product modeling system implemented in software on a computer and it is in this context that the system and method is illustrated and described. It will be appreciated, however, that the system and method can be used for various products wherein the products may include other apparel and other products in which it is desirable to provide betters models of the products. For example, the system may be used for any type of garment or piece of apparel, any item that can be worn or used by a human being or pet, such as a hat, backpack, dog sweater, etc. and/or any other product in which it is desirable to be able to display the product on a model. In addition, the system may be used with any product in which it is desirable to be able to display the product (with an irregular surface) with a design on it, such as a skateboard, a shoe. In addition, the system may be used to display a design on any item with an irregular surface, such as a wall, automobile body, a pencil and the like. Furthermore, the system may be used to identify a product/item in a video wherein a design can be inserted into the product/item in the video. In addition, the system and method can be implemented in software (shown in the illustrated implementation), hardware or a combination of hardware and software and may also be implemented on client/server system (shown in the illustrated implementation), a web server, a terminal, a peer to peer system and the like so that the system and method are not limited to the particular implementation of the system or method.

Figure 1:
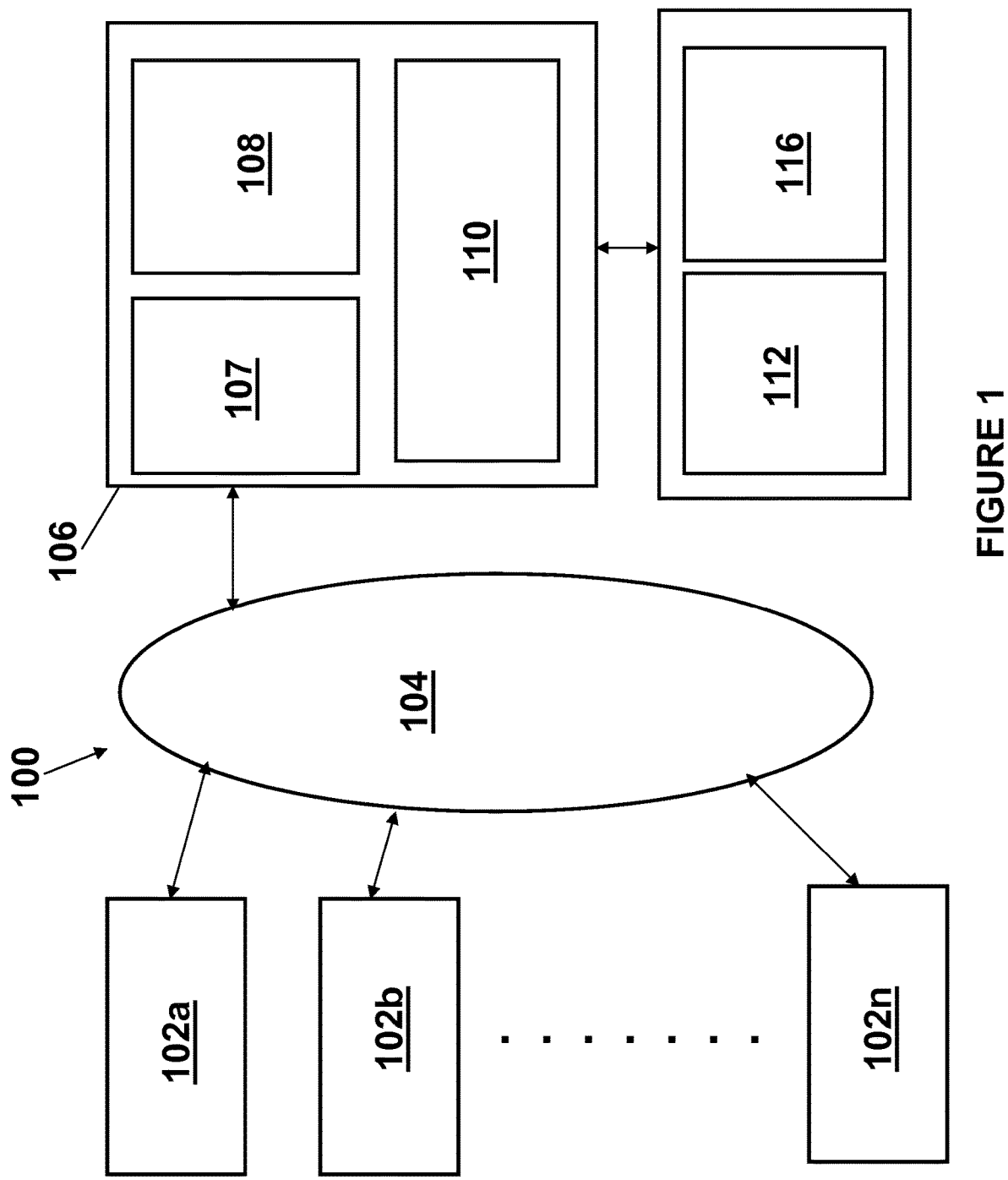
FIG. 1 is a block diagram illustrating an exemplary sales system that may include an implementation of the product modeling system.

FIG. 1 is a diagram of a sales system 100 that markets and sells products wherein the products sold by the system may be modeled using a product modeling system that generates more realistic models for the products. The sales system may include one or more client computing devices 102, such as 102a, 102b, . . . , 102n) wherein each computing device has at least one processing unit, memory, some persistent memory, some other memory, a display device and input/output devices (and each may be a personal computer, mobile device, cellular device, wireless email device, converged device such as a Treo or Blackberry) and the like) that permit the user to interact with the client computing device as well as the sales system through a browser application being executed by the client computing device. Each client may establish a connection with and communicate over a network 104, such as the Internet using a typical secure or unsecure protocol with a sales unit 106 that may, in this example, be one or more server computers. The sales unit 106 may further comprise at least one web server 107 (implemented in hardware or software or a combination of the two) that establishes a connection with each client, receives requests from each client and communicates web pages with information and requests for client information to each client wherein the client interacts with the web server using a known secure or unsecure protocol and a typical browser application. The web server, for example, may serve a web page that allows the consumer to browser the available products and designs and then, using the product modeling system, model the particular design on a particular model of a particular human model on a particular pose. The sales unit may further include a content store 108 that contains the product information and images for the web pages and a well known ecommerce engine 110 that, once the consumer has selected a product with a particular design, may allow the consumer to purchase the product with the particular design.

The sales unit 106 may also be coupled to a product modeling unit that may be implemented on the computing device with the typical elements wherein the product modeling unit may further comprise a product modeling store 112, such as a software implemented database and a memory in the product modeling unit may store a product modeling module 116 that has a plurality of lines of computer code wherein the plurality of lines of computer code are executed by the processing unit to implement the product modeling system and method as described below.

For purposes of illustrating the product modeling system and method, a product modeling method for a piece of apparel, such as a t-shirt, with a design is described below. However, the product modeling system may also be used for other products, such as other apparel and other products in which it is desirable to provide betters models of the products. For example, the system may be used for any type of garment or piece of apparel, any item that can be worn or used by a human being or pet, such as a hat, backpack, dog sweater, etc. and/or any other product in which it is desirable to be able to display the product on a model. In addition, the system may be used with any product in which it is desirable to be able to display the product (with an irregular surface) with a design on it, such as a skateboard, a shoe. In addition, the system may be used to display a design on any item with an irregular surface, such as a wall, automobile body, a pencil and the like. Furthermore, the system may be used to identify a product/item in a video wherein a design can be inserted into the product/item in the video. The output of the product modeling method (an image of the product with a design shown on the product) may be used for various purposes. For example, the output may be used to generate a plurality of product displays with designs on a website that allows consumers to see the products. The example described below is a system in which the product modeling system is tied to a product marketing and selling company wherein the product marketing and selling company has control of models and images of the product modeling system. In another implementation/embodiment of the product modeling system, the system may permit a consumer to provide their own images/models, such as models of the actual consumer, so that the consumer can upload the image to a service and then have the selected design displayed on the model of the actual consumer wherein the service provides: 1) the model components (to create the model form); 2) a tool to upload/modify the model images to the service; and 3) a tool to display the model with the design to the consumer.

Figure 2:
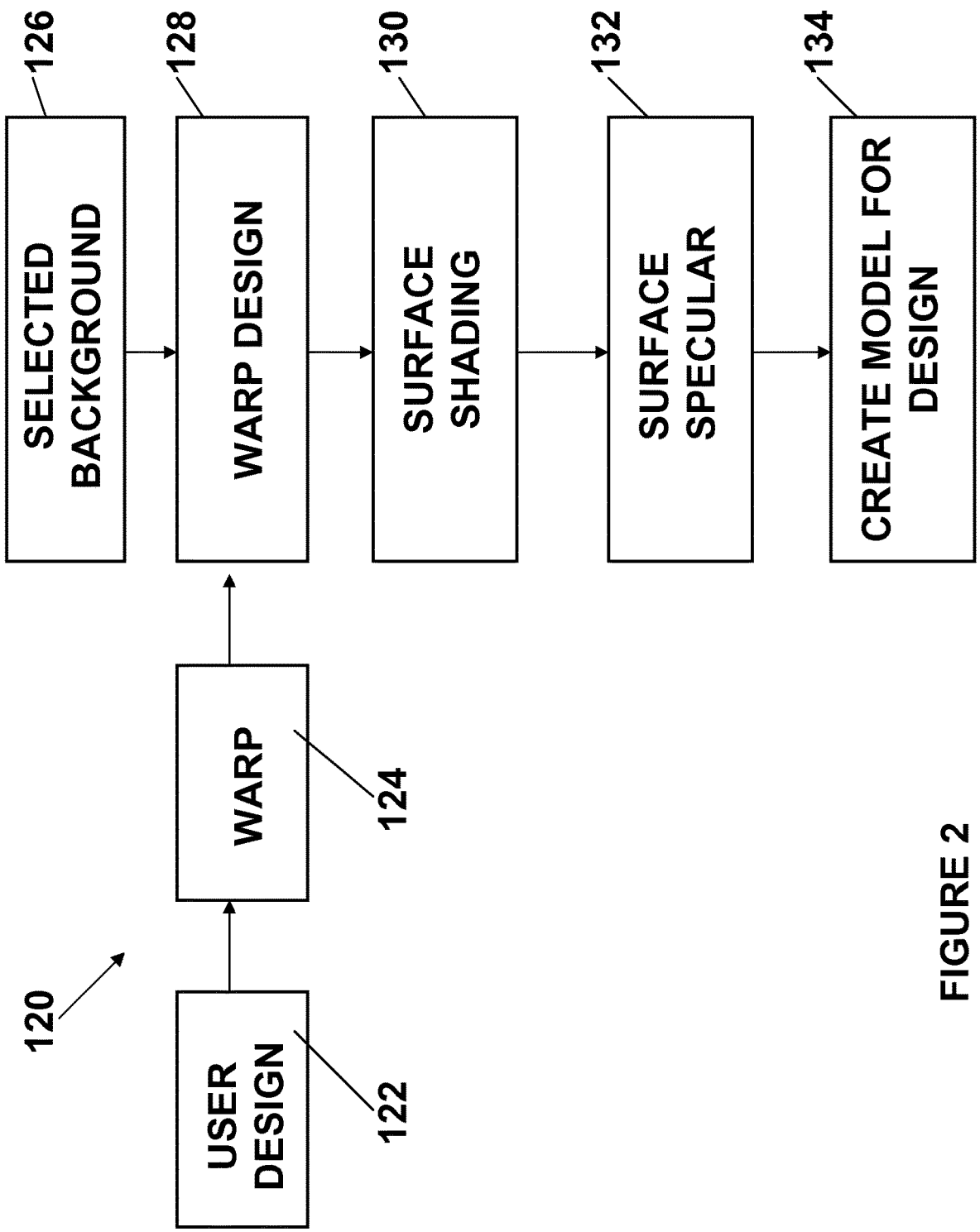
FIG. 2 illustrates an exemplary implementation of a product modeling method.

FIG. 2 illustrates an exemplary implementation of a product modeling method 120 that displays a model with a design on the model wherein the model is a realistic representation of a person with a piece of apparel that has the design on the piece of apparel. The methods shown in FIGS. 2 and 3, the processes described below may be performed by the product modeling module 116 described above. A consumer may select a design (122) such as the design shown in FIG. 8A and a warp process (124) may be performed to generate a warp design (128). The consumer may also select a background (126) for the model such as the backgrounds shown in FIGS. 9A-9C. Once the background and design are chosen by the consumer, the design is warped and then surface shading (130) and a surface specular process (132) is performed. Once these processes are completed, the model is created with the design (134) wherein the model with the design is shown to the consumer. In one embodiment, the model with the design is displayed to the consumer to assist the consumer in previewing the product with the design before the consumer purchases the product with the design, such as through an E-commerce website. Now, the product modeling method is described in more detail.

Figure 3:
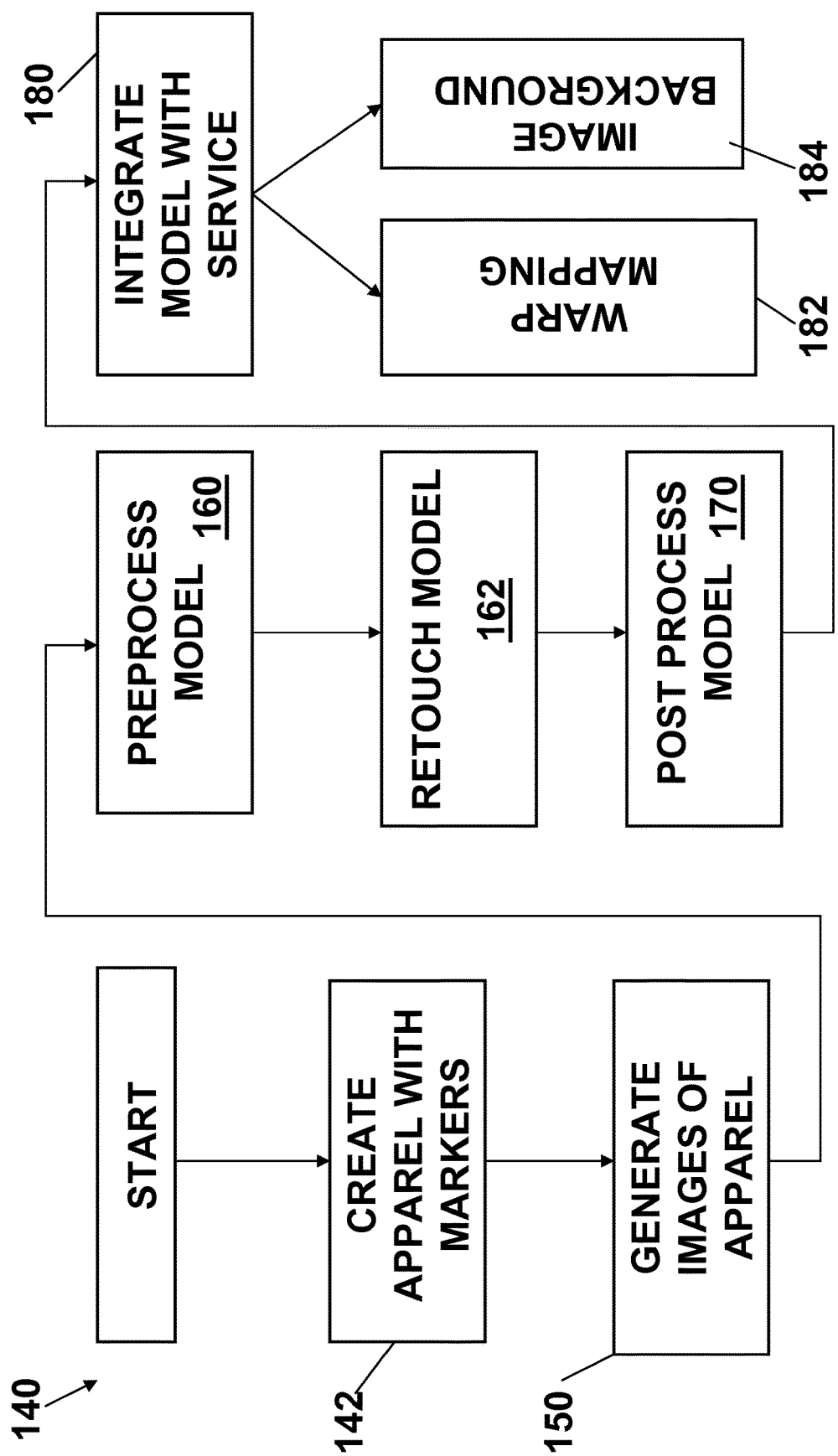
FIG. 3 illustrates further details of an exemplary implementation of a product modeling method.
Figure 4A:
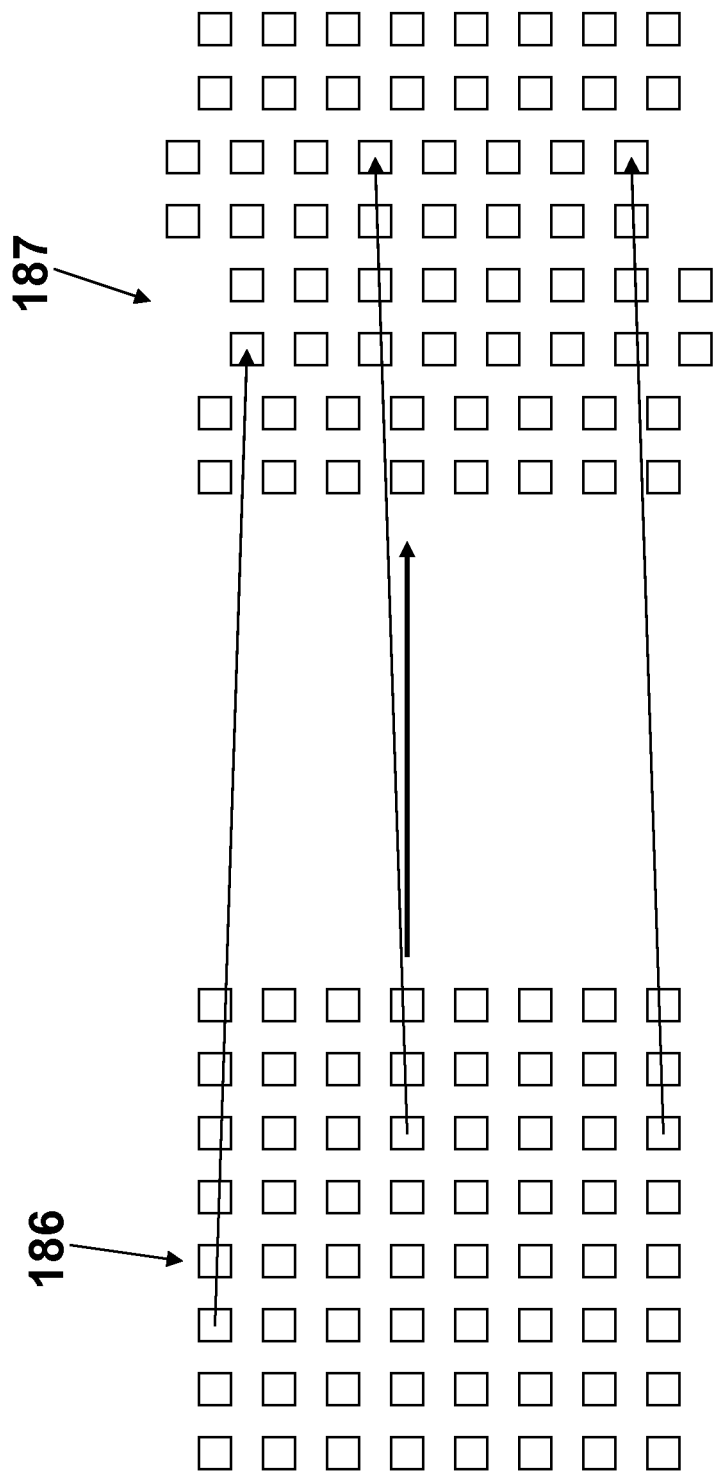
FIGS. 4A and 4B illustrate further details of the process for marking a product in the product modeling method.

FIG. 3 illustrates further details of an exemplary implementation of a product modeling method 140 when used with a piece of apparel. The product modeling method (and the processes set forth below) are implemented, in one embodiment and implementation, as a plurality of lines of computer code that are part of the product modeling module that are executed by a processing unit 106 that is part of the product modeling system. In the method, a piece of apparel is created with a plurality of markers (142) that are used to capture information about the piece of apparel when the piece of apparel is worn by a human model. The plurality of markers may be a marker pattern that encodes, in two dimensions, a flexible substrate that may be detected when the flexible substrate is placed on a complex three dimensional surface wherein the coverage area of the marker pattern does not substantially occlude the substrate that it encodes. For example, the plurality of markers may cover a predetermined percentage, such as 50%, of the piece of apparel, that allow the system to capture information about the piece of apparel when the piece of apparel is worn by a human model. In one implementation, the plurality of markers may form a grid. In more detail, the markers that form a grid on a flat surface (the piece of apparel flat on a surface when the markers are properly positioned on the piece of apparel) may be used to map to a grid of markers on a non-flat surface (the piece of apparel when worn on a human model). As shown in FIG. 4A, the grid of markers 186 on the flat surface are mapped to a grid 187 with the same markers in the same positions on a non-flat surface so that the mapping between the grid on the flat surface and the grid on the non-flat surface is determined. The system may interpolate the marker locations to generate a mapping from the plurality of markers to the grid on the flat surface and may then store the mapping to avoid recalculation of the mapping each time. In one embodiment, the markers may be a number of non-visible lines that form a grid. In another embodiment, the markers may be a plurality of optical markers 190 that may be affixed to a piece of apparel 192 as shown in FIG.

Figure 4B:
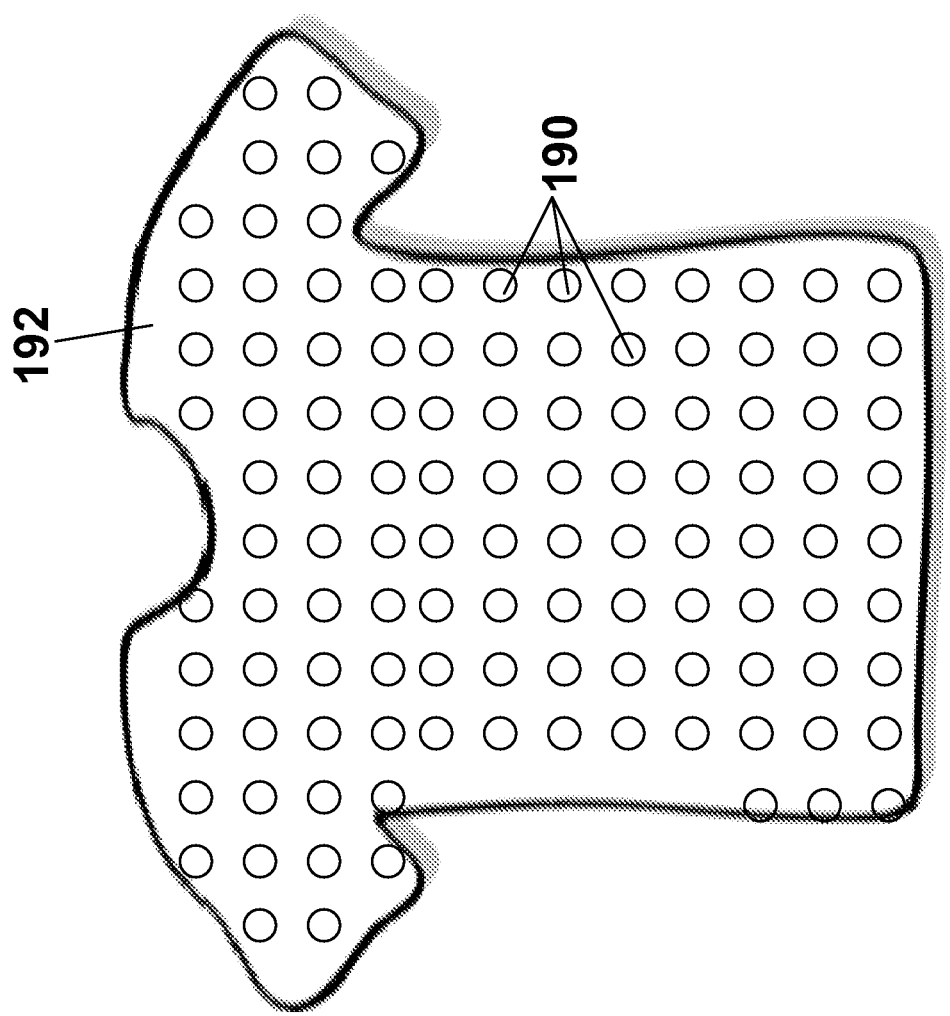
Figure 5A:
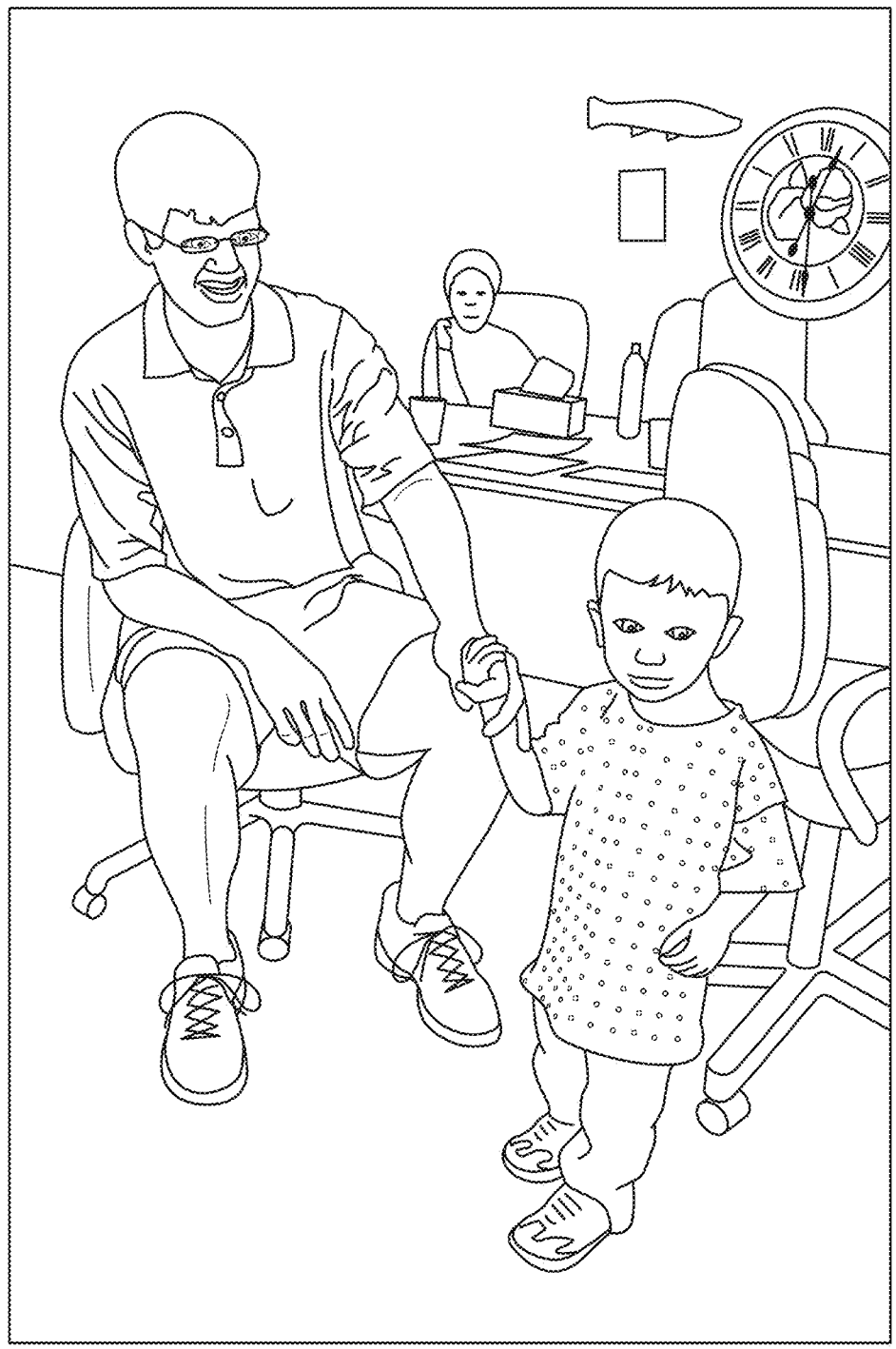
FIGS. 5A and 5B illustrate further details of the process for generating images of a product in the product modeling method.
Figure 5B:

4B that permits the optical tagging of the piece of apparel to map the surface of the piece of apparel when worn by a human model. The optical markers may be made of a reflective material, a colorized material or a diffraction pattern. The reflective material may be retro-reflective material. The colorized material may be pigmented material. The markers may have various shapes (including the dot shape shown in FIG. 4B) and sizes and the method is not limited to any particular shape of the markers. In one embodiment, the plurality of markers may be a film material that has the retro-reflective material in a particular shape. In yet another embodiment, the markers may be a set of markers that form a grid wherein the markers are placed onto the piece of apparel electronically or by other means. In one embodiment in which the product modeling system is used by a business entity that sells apparel, each piece of apparel is placed onto a plurality of human models of different shapes and/or sizes (as shown in FIGS. 5A and 5B) so that the consumer can then choose a model for the piece of apparel that is closest to the intended wearer of the piece of apparel. In another embodiment in which each consumer may create his own model for a piece of apparel, the consumer is provided with the markers (either electronically or as physical markers) so that the consumer can affix the markers to a piece of apparel and then performs the other processes described below. In yet another embodiment, the product modeling system may allow a plurality of users (such as a community of users) to generate a plurality of models that may then be uploaded to the product modeling system.

Once the one or more pieces of apparel are prepared with the markers, an image for each piece of apparel on each different human model may be generated (150) such as by using a camera to take a picture of the piece of apparel being worn by a human model. Prior to taking the image of the piece of apparel with the markers on the human model, the lighting for taking the image is determined. When the user/consumer generates the models, the product modeling system may provide instructions for taking an image of the piece of apparel such as using a flash, using a particular exposure, etc. . . . . In one implementation of the product modeling system, the product modeling system may download a piece of code directly to a user/consumer's camera, such as a digital camera, to set up the camera properly to take the image of the product or item. In particular, the surface model and illumination model for each piece of apparel is determined which also allows the color and lighting for the image to be accurately determined.

Once the image of the piece of apparel on a plurality of human models in a plurality of different poses are taken, the model for the piece of apparel on a particular model in a particular pose are preprocessed (160) by the product modeling system. During the preprocessing, the product modeling system may detect the plurality of markers on the piece of apparel image, remove the marker images from the image of the piece of apparel and then generate a representation of the surface of the piece of apparel when worn by the human model.

In one implementation, the markers may be detected by a distinguishing feature of the markers (spectral difference, reflective difference, textual difference and/or temporal difference), refined by matching geometric properties of the pattern (local pattern finding) and reconstructed by matching the known pattern (local patterns assembled into a known complete pattern.) The reconstructed pattern may then be used to model the shape of the flexible substrate. The product modeling system may have a plurality of local samples of the original unmarked substrate so that the marker pattern can be replaced using the textures of the unmarked substrate as an example that yields an unmarked image suitable for commercial display.

Figure 6A:
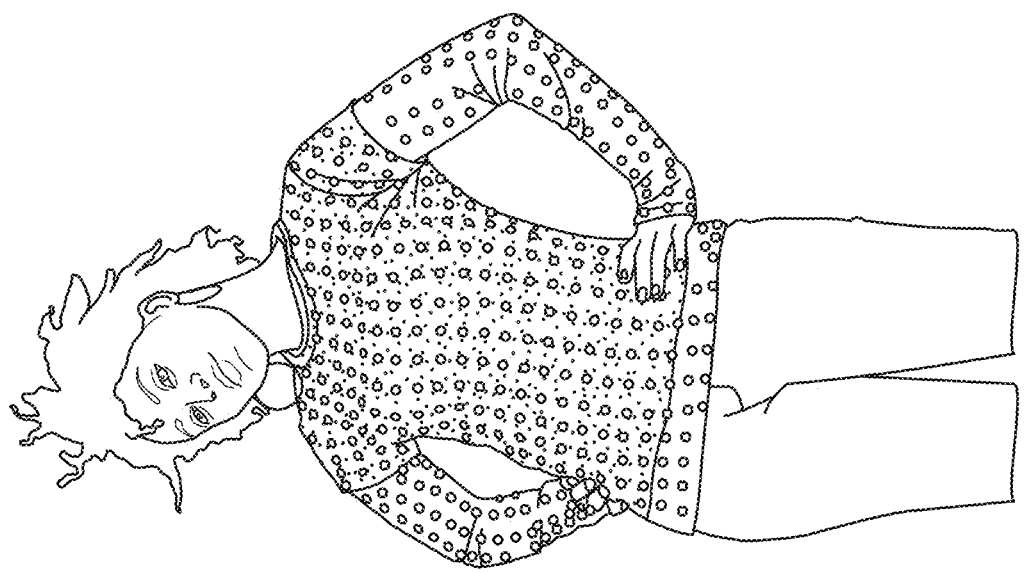
FIGS. 6A-6D illustrate further details of the process for preprocessing the model in the product modeling method.
Figure 6C:
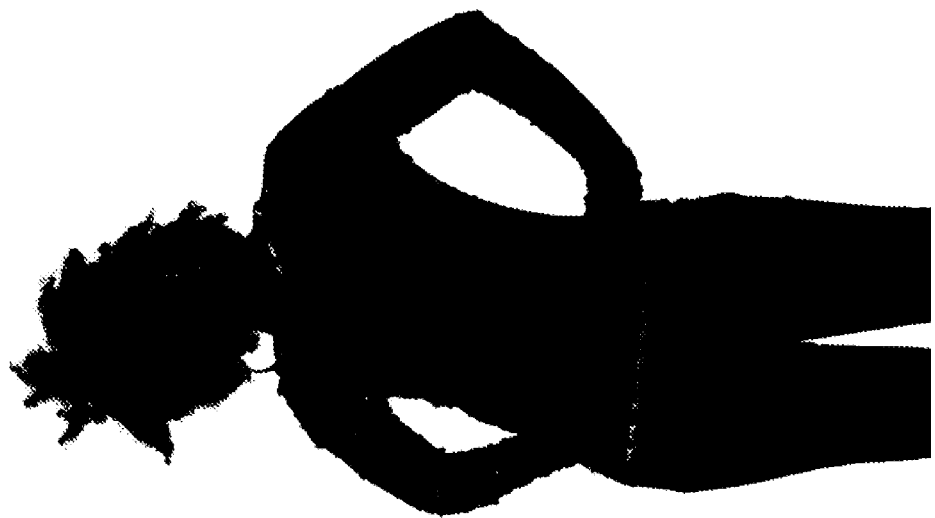
Figure 6B:

The preprocessing process is shown in FIGS. 6A-6C with FIG. 6A illustrating the image of the piece of apparel with the markers, FIG. 6B illustrating the plurality of markers identified on the piece of apparel and FIG. 6C illustrates the image of the piece of apparel with the markers removed. Appendix A (2 pages), incorporated herein by reference, contains an example of the pseudocode for identifying the markers on a product in one implementation of the product modeling system. The steps of the marker identification process for one implementation are set forth in Appendix A. In one implementation, the markers are detected by visible detection. In another implementation of the system, the markers may be detected by a temporal process in which infrared radiation may be used to image the markers at several different times and then the pattern of the markers is detected based on the images of the markers at several different times.

During the identification of the markers, the product modeling system may use various techniques. For example, edge detection may be used to identify each marker and the spacing between the markers that can then be used to generate the grid of markers on the surface of the piece of apparel when worn on a human model that thus allows the surface of that piece of apparel on the particular human model in a particular pose to be accurately determined. Alternatively, the system may threshold at the white color based on the color calibration and then locate elements above the threshold and then also identify the background including elements of the human model such as jewelry, an eye or the background behind the human model. The system may also use histograms to identify the markers and the background.

The marker images (once identified) may be removed from the image of the piece of apparel (as shown in FIG. 6C) by various processes. For example, the markers may be removed by, for each marker location, identifying the texture adjacent the marker and then filling in the location of the marker with the texture in the adjacent area. Alternatively, the system may use image coherence and synthesize the image to remove the markers in the image.

Figure 6D:
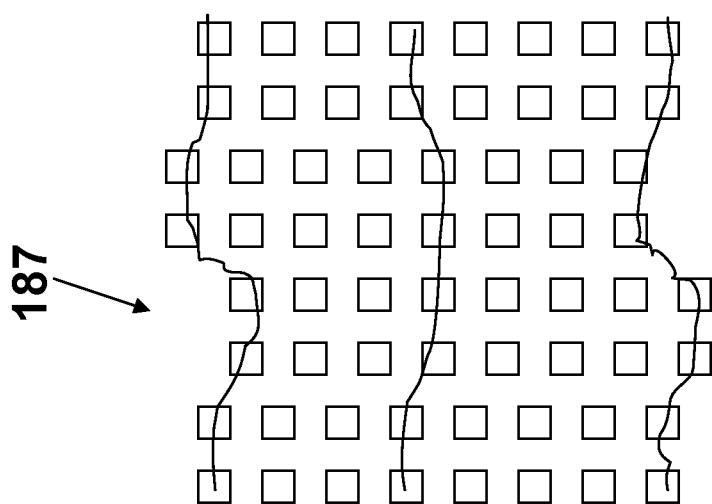

To generate the representation of the contours of the surface of the piece of apparel when worn by a particular human model in a particular pose, the system maps the position of the markers 190 relative to each other as shown in FIG. 6D into a set of contour curves 194 that represent the surface of the piece of apparel when worn by a particular human model in a particular pose. Since the system has information about the markers and the grid that they form on a flat surface as shown FIG. 4A, the system is able to determine the contours of the surface of the piece of apparel when worn by a particular human model in a particular pose.

Figure 7B:
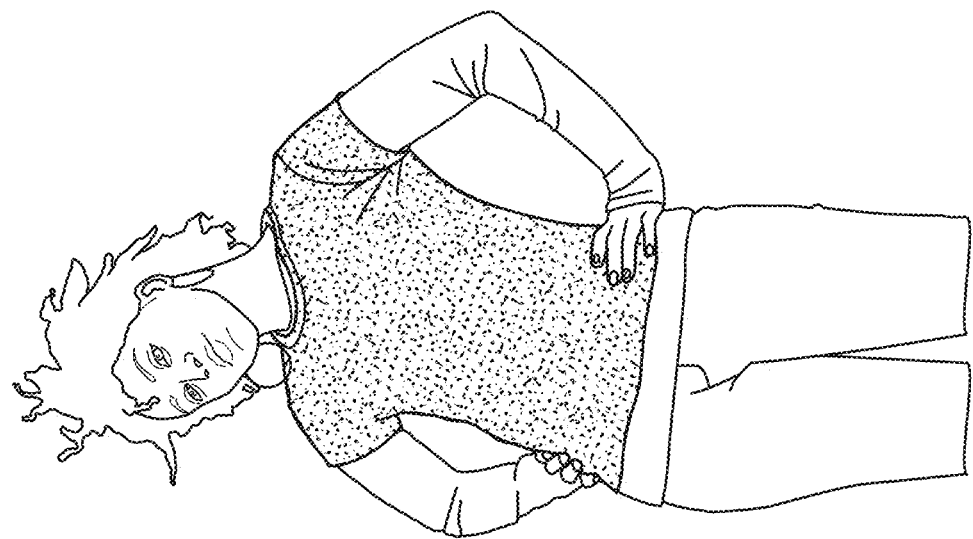
FIGS. 7A-7C illustrate further details of the post processing process in the product modeling method.
Figure 7A:
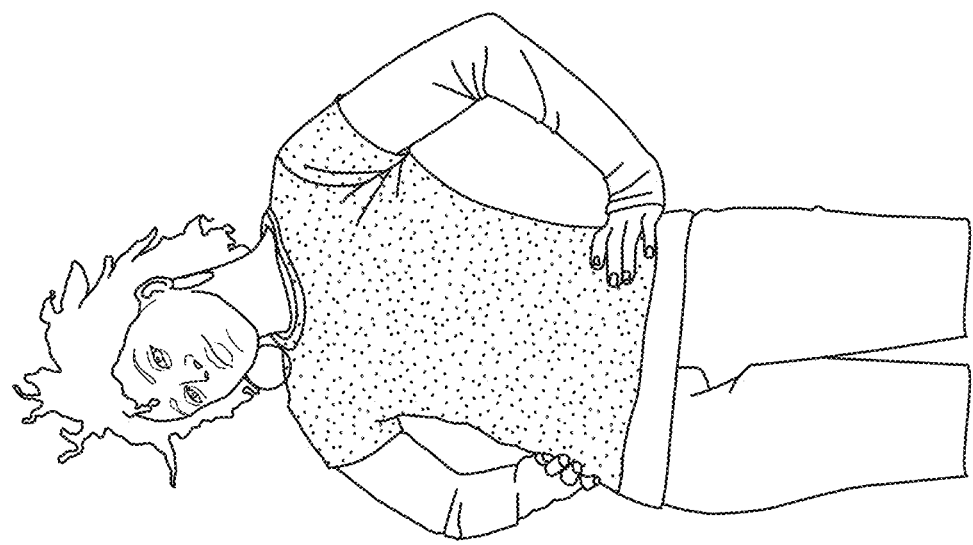
Figure 7C:
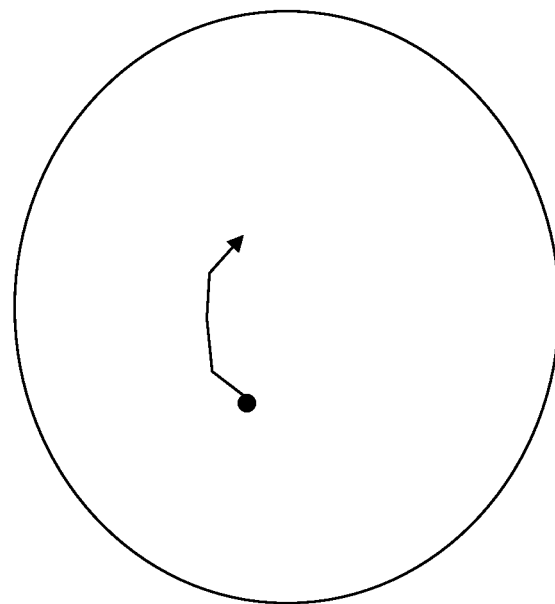
Figure 7C:
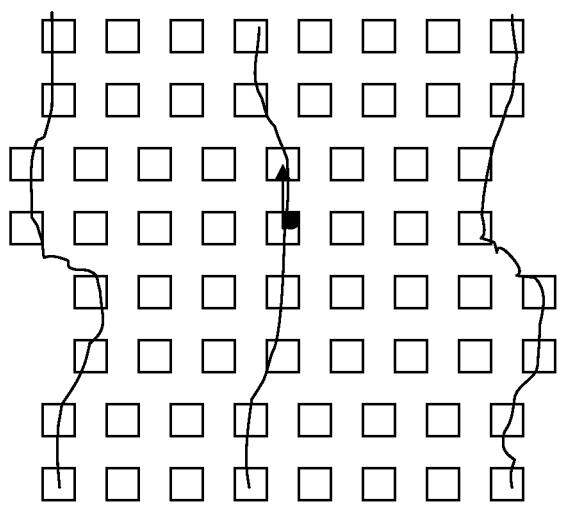

Once the contours of the surface is determined and the preprocessing is completed, the model of the piece of apparel when worn by a particular human model in a particular pose may be retouched (162) as needed. Then, the model is post-processed (170) by the product model system. During the post-processing process, the product model system colorizes the model using a color mapping module that is part of the product model system. The colorizing allows each model for each piece of apparel on a particular human model in a particular pose to have the piece of apparel converted into any colors such as the two different colors shown in FIGS. 7A and 7B. As shown in FIG. 7C, the system may use the color calibration card with a known spectral response for each session to calibrate images for the same session. To change the color for the piece of apparel, the fabric may be wrapped onto a sphere as shown in FIG. 7C which is then mapped to the model to change the color of the model.

Appendices B-E, incorporated herein by reference, illustrate, for a particular implementation of the product modeling system, the code for 1) remapping the color of an image using normalized ordinal color distribution; 2) building a color map in normalized histogram order with an index from a matching color space; 3) building a look-up table to remap the colors from a source sphere to a destination sphere; and 4) remapping the color of the source image with a source sphere color map to a destination image with the color map of the sphere color object. Using the code set forth in these appendices (and the process steps described in these appendices), the color mapping process: 1) builds a color map (the BuildMap code in Appendix C) for the source image using a sphere to build a histogram and then a sorted table; 2) builds a remap table (the BuildReMap table code in Appendix D); 3) remaps the image colors (the code in Appendices B and E) onto the product. The system may also layer color and texture so that the colorized model of the particular piece of apparel on the particular human model in the particular pose more accurately emulates different fabrics and/or threads of the fabric which results, for example, in an accurate emulation of the printed ink of the design on the piece of apparel with the particular type of fabric.

Once the colorization is completed, the model for a particular piece of apparel on a particular human model in a particular pose is integrated into a service (180) such as a website that has the pieces of apparel with particular designs for sale to consumers.

Figure 8B:
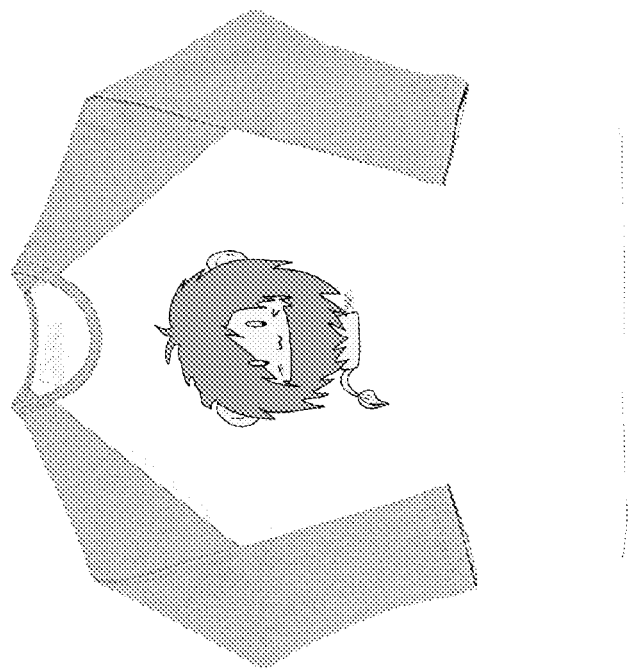
FIG. 8B illustrates a typical image of a piece of apparel with the design in a typical system.
Figure 8A:
FIG. 8A illustrates an example of a design to be placed on a piece of apparel.

When the model is integrated into the service, the product modeling system may perform warp mapping (182) on a design selected by the consumer and permit the user to select a particular background (184). An example design is shown in FIG. 8A. The exemplary design shown on a piece of apparel in a typical system with a flat image is shown in FIG. 8B. Using the product modeling system, a mapping between the design image and the surface contour of the model of the particular piece of apparel on the particular human model in the particular pose (See for example FIG. 8D) is done so that the design is shown on the model as shown in FIG. 8E is a more realistic three dimensional manner.

Figure 8D:
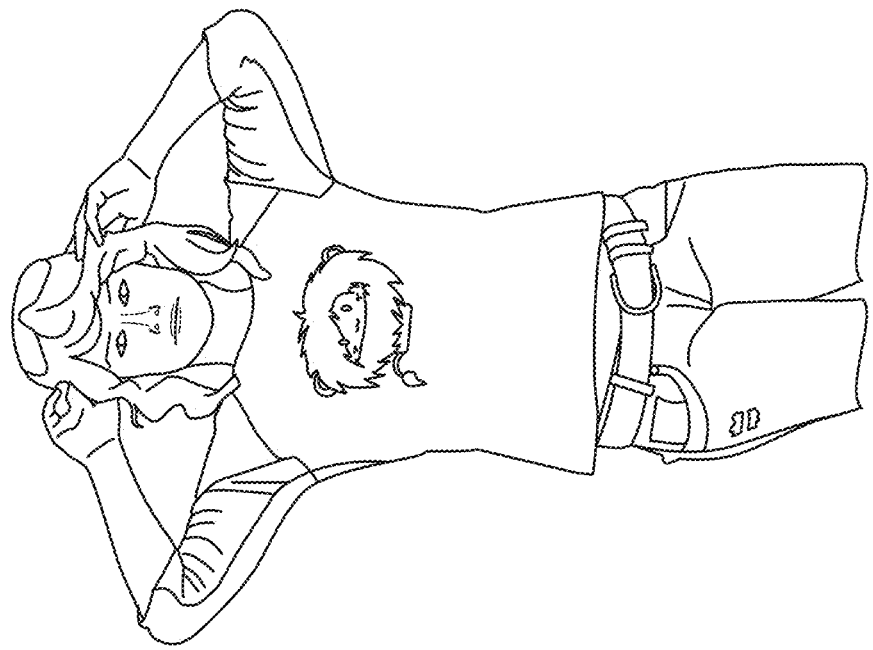
FIGS. 8C-8D illustrate the design on a piece of apparel in the product modeling system.
Figure 8C:
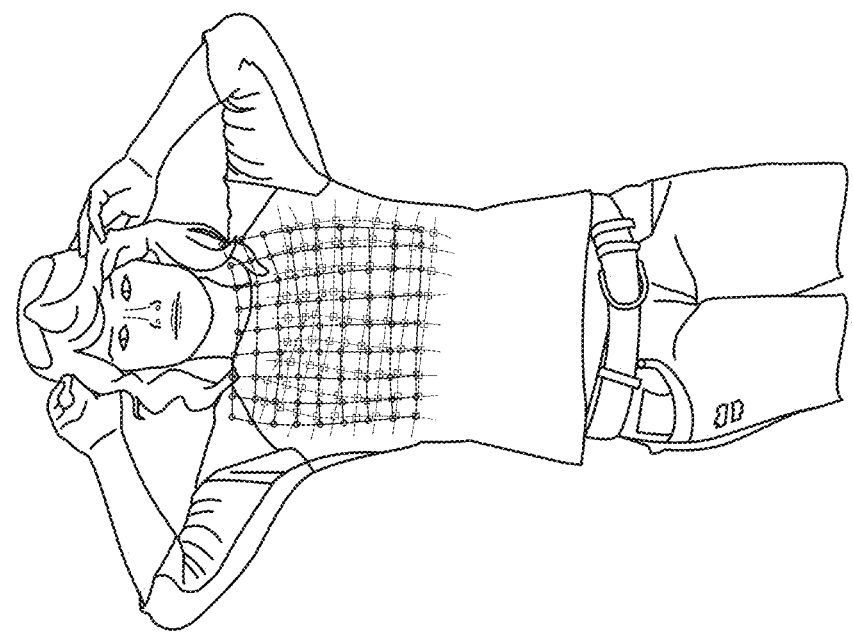
Figure 8E:
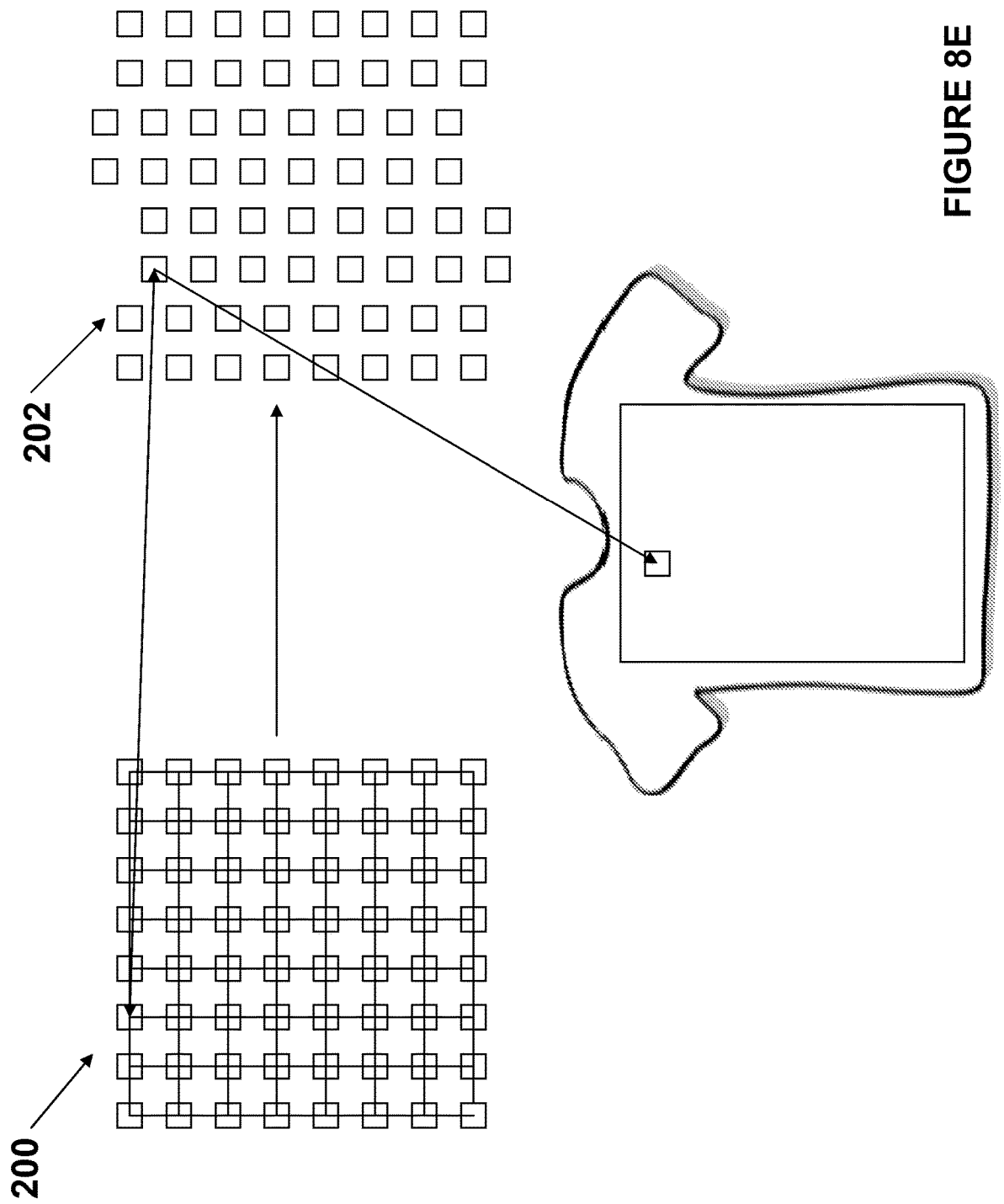
FIG. 8E illustrates the process for placing the design on the model.
Figure 9B:
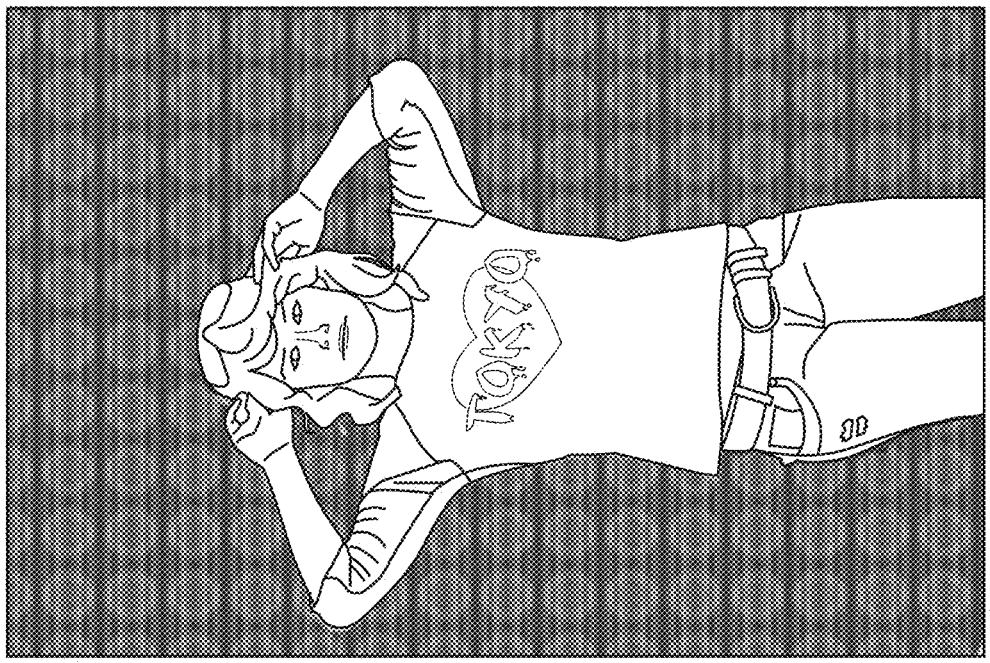
FIGS. 9A-9C illustrate a process for changing the background against which the piece of apparel with the design is displayed in the product modeling system.
Figure 9A:
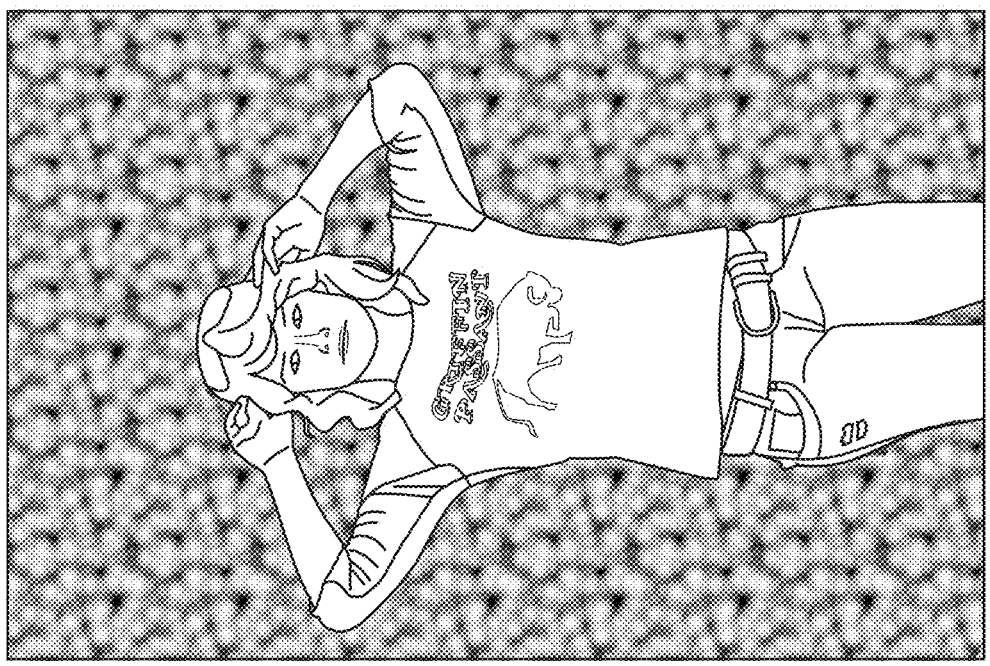
Figure 9C:
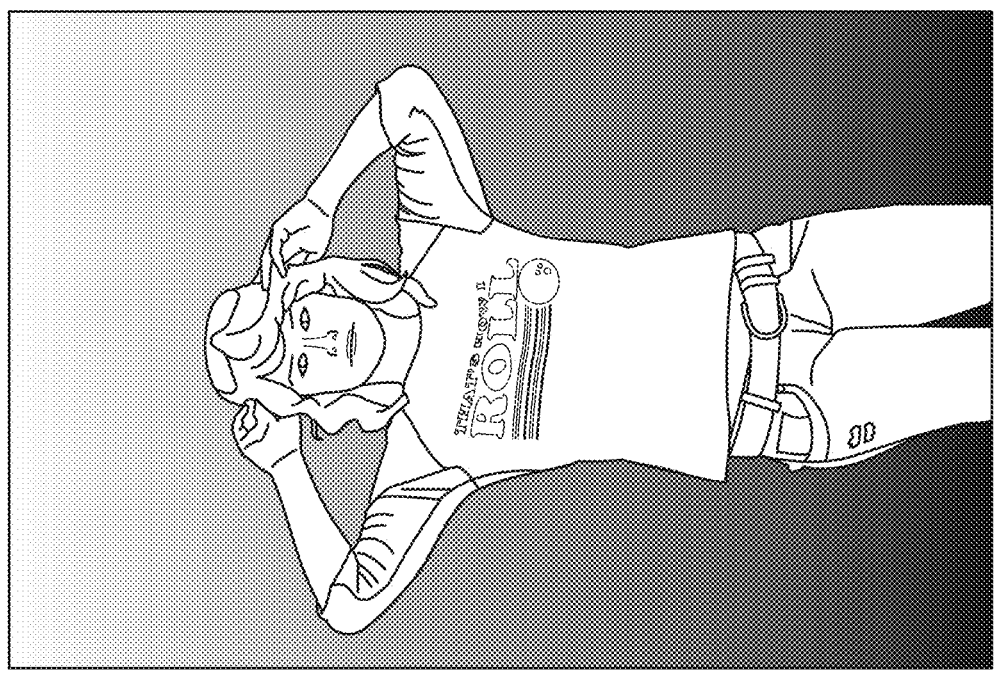

During the warp mapping (that may be a bicubic image warp), a grid of the design 200 is mapped to the surface contour grid 202 which is then placed onto the piece of apparel to generate the more realistic model for the piece of apparel with the design as shown in FIG. 8D. In the mapping process, a point in the design is mapped to the surface contour grid which is in turn mapped onto the piece of apparel. The image background can be easily exchanged by the product modeling system as shown in FIGS. 9A-9C.

Although the example provided herein is for a piece of apparel (a shirt) worn by a human being, the product modeling system may be used for various different products (other pieces of apparel, other garments, hats, shoes, pet clothing, inanimate objects such as cups) with various different models (human models, animal models, inanimate models such as robots or mannequins) and with any number of different poses for the models since the above example is merely illustrative.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for selling products modeled using a product modeling system, comprising:
a computer based sales unit for making a plurality of products available for sale;
a plurality of markers that form a marker pattern on a product that does not occlude a surface of the product;
a computer based product modeling unit that displays a visual representation to a consumer of a design on a product available for sale on the sales unit when the design is on an object using a captured contour of a surface of the product on the object, wherein the product modeling unit further comprises a camera that captures a single image of the product on the object and the plurality of markers that is communicated to a computing device and the computing device that captures a contour of a design area when that design area is on the product that is represented on the object from the single image, a lighting of the product and a texture of the product in the single image taken by the camera, electronically applies a user design to the product and generates the visual representation of the user design on the product when the product having the user design is on the object using the captured lighting, texture and contours of the product and the object so that the visual representation of the design on the product has the contour of the surface of the product; and
an ecommerce system that permits the consumer to purchase the product with the design on the product that was modeled by the product modeling unit.

2. The system of claim 1, wherein the sales unit further comprises a web server that generates a web page that displays the visual representation of the product with the design on a web page to the consumer.

3. The system of claim 1, wherein the object further comprises a human model, a mannequin or an animal.

4. The system of claim 1, wherein each marker further comprises a piece of pigment.

5. The system of claim 1, wherein each marker further comprises a piece of reflective material.

6. The system of claim 5, wherein the piece of reflective material further comprises a piece of retro-reflective material.

7. The system of claim 1, wherein each marker further comprises a circular marker.

8. The system of claim 1, wherein the plurality of markers further comprises a grid of lines not visible to a human on the product.

9. The system of claim 1, wherein the product further comprises a piece of apparel, a garment, an item worn by a human being or an item worn by an animal.

10. The system of claim 1, wherein the computing device maps one or more points on the design to one or more points on the contour of the surface of the product on the object.

11. The system of claim 1, wherein the computing device colorizes the contour of the surface of the product on the object prior to generating the visual representation of the design on the product.

12. The system of claim 11, wherein the computing device texturizes the contour of the surface of the product on the object prior to generating the visual representation of the design on the product.

13. The system of claim 1, wherein the computing device further comprises a networked computing system, a client/ server system, a peer-to-peer system, an ASP model type system, a laptop computer, a mobile device or a mobile cellular phone.

14. The system of claim 1, wherein the product modeling unit further comprises a unit for receiving a captured contour of a surface of a product on the object from a consumer.

15. The system of claim 1, wherein the marker pattern further comprises a grid of markers.

16. A method for sales using product modeling, the method comprising:
   providing a plurality of products available for sale using a computer based sales unit;
   displaying a visual representation to a consumer of a design on a product when on an object using a captured contour of a surface of the product on the object from a single image taken by a camera, wherein displaying the visual representation further comprises providing, using the camera, a contour of a design area, a lighting of the product and a texture of the product when that design area is on the product that is represented on the object in the single image, using the single image, the product on the object using a plurality of markers on the product that form a marker pattern on the product that does not occlude a surface of the product, electronically applying a user design to the product, and generating a visual representation of the user design on the product when the product having the user design is on the object using the captured lighting, texture and contours of the product and the object so that the visual representation of the user design on the product has the contour of the surface of the product; and
   permitting a consumer to purchase the product with the user design on the product that was modeled by the product modeling unit.

17. The method of claim 16, wherein displaying the visual representation further comprises placing the plurality of markers on the product to create a grid, imaging the product on the object with the grid to generate an imaged product and capturing a contour of a surface of the product when the product is on the object based on the imaged product.

18. The method of claim 17, wherein placing the plurality of markers on the product further comprises electronically affixing the plurality of markers to an image of a physical product.

19. The method of claim 17, wherein each marker further comprises a piece of pigment.

20. The method of claim 17, wherein each marker further comprises a piece of reflective material.

21. The method of claim 20, wherein the piece of reflective material further comprises a piece of retro-reflective material.

22. The method of claim 17, wherein each marker further comprises a circular marker.

23. The method of claim 17, wherein placing the plurality of markers on the product further comprises placing a grid of lines not visible to a human on the product.

24. The method of claim 17 further comprising displaying the visual representation of the product with the user design on a web page to the consumer.

25. The method of claim 17, wherein the object further comprises a human model, a mannequin or an animal.

26. The method of claim 25, wherein placing the plurality of markers on the product further comprises affixing the plurality of markers to a physical product.

27. The method of claim 16, wherein the product further comprises a piece of apparel, a garment, an item worn by a human being or an item worn by an animal.

28. The method of claim 16, wherein generating the visual representation of the design on the product further comprises mapping one or more points on the design to one or more points on the contour of the surface of the product on the object.

29. The method of claim 28, wherein the mapping the one or more points further comprising using a warp mapping.

30. The method of claim 29, wherein the warp mapping further comprises using a bicubic image warp.

31. The method of claim 16, wherein generating the visual representation of the user design on the product further comprises further comprises colorizing the contour of the surface of the product on the object prior to generating the visual representation of the design on the product.

32. The method of claim 31, wherein colorizing the contour of the surface of the product further comprises using a color calibration card.

33. The method of claim 31, wherein generating the visual representation of the design on the product further comprises further comprises texturizing the contour of the surface of the product on the object prior to generating the visual representation of the design on the product.

34. The method of claim 16 further comprising receiving a captured contour of the surface of the product on the object from a consumer.

35. The method of claim 16, wherein the pattern further comprises a grid of markers.

* * * * *